United States Patent [19]

Rousom

[11] 4,105,344
[45] Aug. 8, 1978

[54] CONNECTOR FOR ATTACHING A SWIVEL PAD TO A SUPPORTING BOLT OF A CLAMP

[75] Inventor: Harold G. Rousom, Cambridge, Canada

[73] Assignee: James Morton Limited, Cambridge, Canada

[21] Appl. No.: 665,461

[22] Filed: Mar. 10, 1976

[30] Foreign Application Priority Data

Mar. 11, 1975 [CA] Canada .................................. 221860

[51] Int. Cl.² .............................................. F16C 11/06
[52] U.S. Cl. ...................................... 403/24; 269/249; 403/77; 403/143
[58] Field of Search ............... 269/249, 261, 262, 258; 403/24, 143, 77, 122, 90, 287

[56] References Cited

U.S. PATENT DOCUMENTS

| 948,980 | 2/1910 | Tischler | 269/249 |
|---|---|---|---|
| 2,156,195 | 4/1939 | Robillard | 269/249 X |
| 2,649,123 | 8/1953 | Gulland | 269/261 |
| 3,276,798 | 10/1966 | Merriman | 269/261 X |
| 3,400,408 | 9/1968 | Garcia | 403/77 X |
| 3,424,419 | 1/1969 | Siegel | 403/143 X |
| 3,856,422 | 12/1974 | Trefry | 403/122 |

FOREIGN PATENT DOCUMENTS

| 986,575 | 3/1951 | France | 269/258 |
|---|---|---|---|
| 180,565 | 1/1936 | Switzerland | 403/90 |
| 835,709 | 5/1960 | United Kingdom | 403/326 |

*Primary Examiner*—Andrew V. Kundrat
*Attorney, Agent, or Firm*—Arne I. Fors

[57] ABSTRACT

An improved connector for attaching a swivel pad to a supporting bolt of a clamp for maintenance, replacement or lubrication and which permits pivoting of the swivel pad over a wide angle. The connector has particular utility in combination with a screw clamp and comprises a shoe assembly having a work-engaging pad with a socket for receiving a truncated spherical head of a screw bolt and means for restraining the said truncated head in the socket.

14 Claims, 7 Drawing Figures

U.S. Patent
Aug. 8, 1978
4,105,344
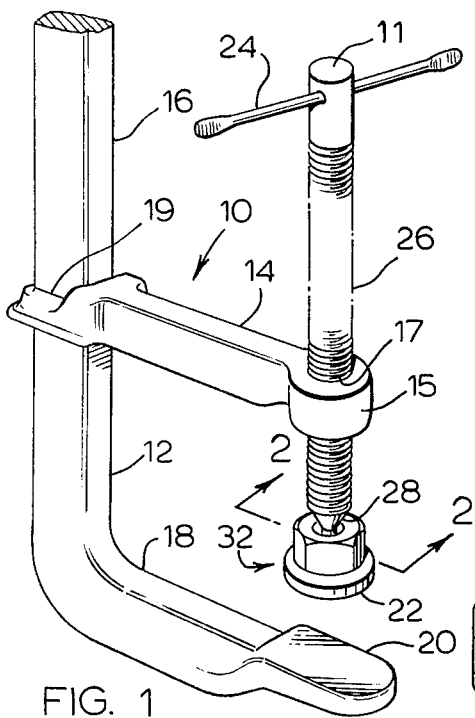
FIG. 1
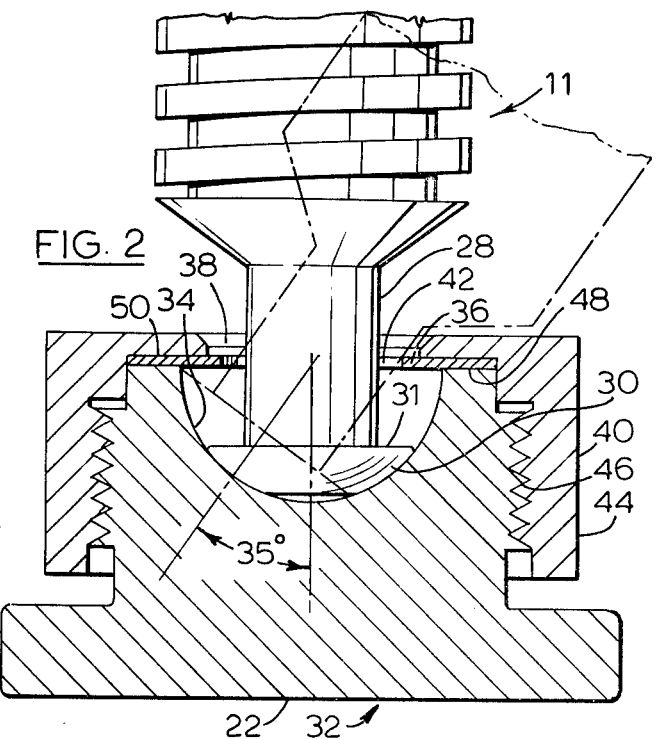
FIG. 2
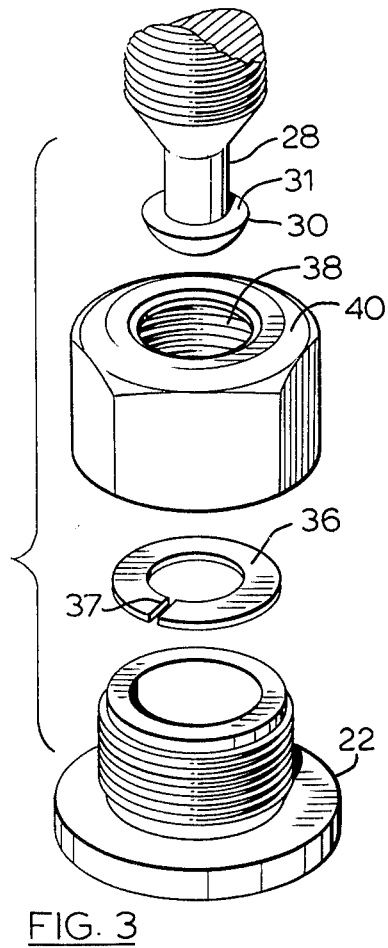
FIG. 3
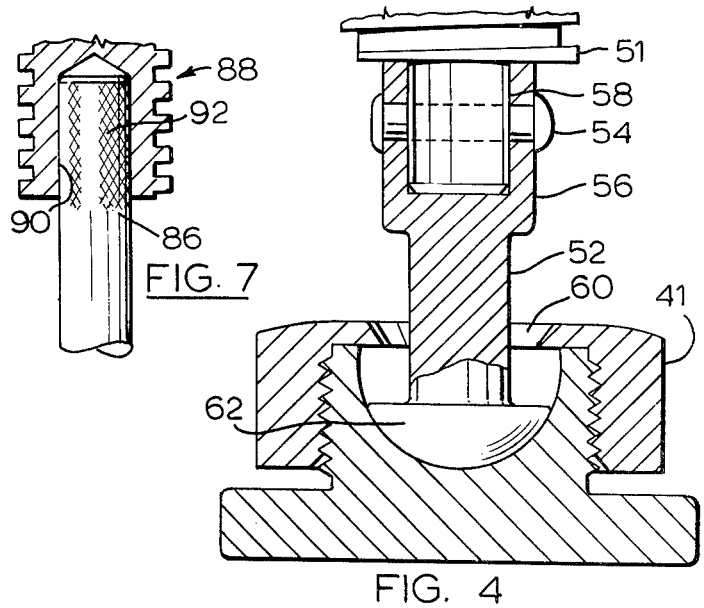
FIG. 4
FIG. 7
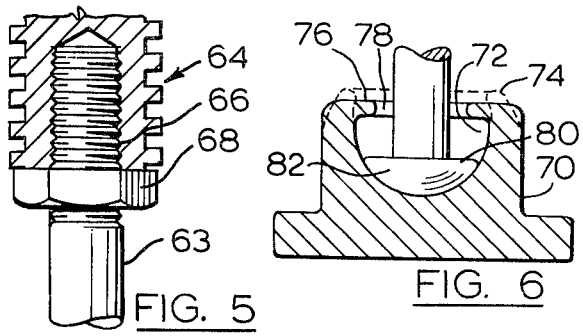
FIG. 5
FIG. 6

4,105,344

CONNECTOR FOR ATTACHING A SWIVEL PAD TO A SUPPORTING BOLT OF A CLAMP

BACKGROUND OF THE INVENTION

This invention relates generally to an improved connector for use with clamps for maintaining work-pieces in a stationary hold-down position. More particularly, the invention relates to a connector for use with a screw clamp having a work-piece contacting pad which permits both rotating and swivelling of the pad and, in certain embodiments, facile connection and disconnection of the pad from the clamp.

Wide use is made in industry of clamps for maintaining work-pieces stationary to permit the carrying out of various operations on them. The clamps usually consist of a generally C-shaped frame having a fixed pad for engaging a work-piece formed on one leg and a bolt threaded for axial movement received in an aperture formed in the other opposed leg, said bolt having a pad connected by a swivel to the free end thereof. The clamp frame alternatively can comprise an L-shaped frame having a leg slidably mounted on the shank of the frame perpendicular to the shank and parallel to the fixed leg of the frame. A fixed pad for engaging a work-piece is formed at the end of the fixed leg and a pad is connected by a swivel to the end of a bolt threaded into the movable leg.

To engage a work-piece, the movable leg of the clamp is adjusted, if slidably adjustable, so that the work-piece may be accommodated in the space between the fixed pad and swivel pad and, in both the foregoing embodiments, the threaded bolt is rotated to bring the swivel pad into abutment with the work-piece which is held against the fixed pad.

A serious shortcoming of such clamps is that there is no simple means by which the swivel pad can be removed from the bolt shank. When, for example, the threads of the bolt shank become clogged with weld spatter or are damaged by misuse, the bolt and swivel pad connected thereto must be discarded since there is usually no ready method of removing the pad from the bolt in a user's shop. So too must the bolt and swivel pad usually be discarded when the swivel connection between the pad and the shank is rendered inoperable because of weld spatter, dirt or other foreign material since the two elements cannot be separated to permit cleaning and lubrication of the connection.

Another shortcoming of such clamps is that special tools normally are required to attach the swivel pad to the bolt shank. Should, for example, the swivel pad accidentally separate from the bolt shank, the pad cannot usually be reattached because the user lacks the necessary swaging machinery to do so.

Detachable swivel pads are known, as shown in U.S. Pat. Nos. 260,510; 1,387,996; and 2,579,995. However, a shortcoming of such clamps is that the swivel pad is capable of only very limited tipping or pivoting, if any, and hence such clamps are not well suited to grasping irregularly shaped work-pieces commonly encountered.

It is an object of the present invention to provide a clamp having means by which a swivel pad can be readily connected to and, in certain embodiments, readily separated from the shank of a bolt without the necessity of any special tools or equipment.

It is another object of the invention to provide a clamp having a swivel pad capable of pivoting over a very wide angle and hence capable of grasping work-pieces of a variety of shapes.

And a further object of the invention is the provision of a connector for securing a pressure pad to a bolt shank which permits a wide clearance between the pad and bolt shank for easy removal of foreign material.

STATEMENT OF THE INVENTION

These and other objects of the invention are accomplished by a connector for securing a swivel pad to a bolt shank of a clamp comprising a first connecting element formed at one end of said bolt shank; a shoe assembly having said pad for contacting a work-piece and having a second connecting element formed therein, said first connecting element comrpising a head and said second connecting element comprising a socket for receiving said head, said head being of enlarged cros-sectional area relative to the adjacent portion of the shank and having a substantially spherical end surface truncated adjacent the shank, and the entrance of the socket being of lesser cross-sectional area than said head, whereby said shoe assembly can freely pivot and swivel about the end of the shank.

BRIEF DESCRIPTION OF THE DRAWING

A fuller understanding of the invention may be had by referring to the following description of a preferred embodiment thereof taken in conjunction with the accompanying drawing in which:

FIG. 1 is a perspective view of an embodiment of a screw clamp, of a slidable form, of the present invention;

FIG. 2 is a section in enlarged scale on line 2—2 of FIG. 1;

FIG. 3 is an exploded perspective view of the screw clamp shown in FIGS. 1 and 2;

FIG. 4 is a sectional view, partly in perspective, of another embodiment of the invention.

FIG. 5 is a sectional view of a component of still another embodiment of the invention;

FIG. 6 is a sectional view of a further embodiment of the invention; and

FIG. 7 is a sectional view of a still further embodiment of the invention.

Like reference characters refer to like parts throughout the description of the drawing.

DESCRIPTION OF THE PREFERRED EMBODIMENT

With reference to FIG. 1, the screw clamp which incorporates the structure of the invention, indicated generally by the numeral 10, is of the type which is referred to in the trade as a "C-clamp." The clamp comprises a rotatable shank 11, a fixed frame member 12 and a movable second member 14. Member 12 is shown L-shaped and is composed of an elongated longitudinally extending limb 16 and a limb 18 which extends laterally from limb 16 and teminates at a fixed pad 20 which contacts one side of a work-piece. It will be understood that although the clamp is shown to comprise two components 12, 14 defining a C-shape, of which member 14 is adjustably mounted on L-shaped member 12, the clamp can comprise a frame structure in which member 14 is formed integral as part of member 12 whereby limb 18 is parallel to and spaced a fixed distance from member 14.

Movable member 14 is provided adjacent its two ends with apertures 17,19. Threads are provided in the wall defining aperture 17 for rotatable accommodation of shank 11 while the wall defining aperture 19 conforms to the shape of the walls of limb 16 so that limb 16 may be slidably accommodated in aperture 19. Member 14 may thus be slid longitudinally along limb 16 so that work-pieces of a variety of sizes can be accommodated in the variable space defined between the fixed pad 20 and pad 22 at the lower end of shank 11 and member 14 locked on limb 16 conventionally by biasing the free end 15 of member 14 in a counterclockwise direction, as viewed in FIG. 1, away from fixed pad 20. Shank 11 is provided with a handle 24 adjacent its upper end to facilitate manual rotation of externally threaded intermediate portion 26 for axial movement of shank 11 towards or away from pad 20. Neck portion 28 of shank 11 preferably has a reduced cross-sectional area which terminates at a truncated spherical or the like bulbous head 30 having a peripheral shoulder 31 of greater cross-sectional area than the adjacent neck portion 28.

Turning now to FIGS. 2 and 3, shoe assembly 32 is seated on head 30 and comprises aforementioned pad 22 which has socket 34 formed therein adapted to receive bulbous head 30, head 30 and socket 34 having substantially equal radii of curvature, as indicated. The socket is sufficiently large in cross-section that head 30 may be freely introduced into it and removed therefrom. The head is retained in the socket by means of a split ring 36 secured to the pad at the mouth 38 of the socket by cap 40 threaded onto the said pad 22. The ring 36 is preferably formed from spring steel or the like resilient metal and has central opening 42 of lesser cross-sectional area than the cross-sectional area of head shoulder 31, i.e., the internal diameter of the ring is smaller than the diameter of the head at the point at which its cross-sectional area is the greatest, i.e., the major diameter of the head. The ring opening 42, is, however, of greater cross-sectional area than that of the portion of the shank bounded by the neck portion 28.

As shown most clearly in FIG. 3, ring 36 has a radial cut 37 so that it is axially deformable to permit passage of head 30 between the ends of the ring and seating of the ring onto shank neck 28. Cap 40 having central opening 38 of a diameter greater than the maximum diameter of head 30 preferably has a hexagonal exterior wall 44 to permit engagement by a wrench for tightening onto pad 22 by mating threads 46. Split ring 36 is secured flat between the upper surface 48 of pad 22 and the interior surface 50 of cap 40.

The cap 40 and ring 36 together serve as a connecting element and cooperate with the truncated head and neck 28, which in like manner serve as a connecting element, for attaching the shoe assembly 32 to shank 11. With further reference to FIG. 2, the angle of pivot of the shoe assembly 32 is dependent on the relative diameters of ring opening 42 and shank neck 28 and the pivot radius of the head 30 which preferably substantially conforms to the radius of the pad socket 34. A pivot angle of about 35° to the perpendicular is shown by the ghost lines.

Attachment of shoe assembly 32 to head 30 is accomplished by placing cap 40 onto neck 28 by inserting head 30 through opening 38 and opening split ring 36 such that it can be forced over head 30 onto neck 28. Cap 40 is then threaded onto pad 22 to squeeze ring 36 therebetween anchoring shoe assembly 32 onto shank 11. The shoe assembly is now free to swivel and to rotate relative to the shank.

With reference to FIG. 4, another embodiment of my invention is shown in which neck 52 is formed separately from shank 51 permitting cap 41 to be placed onto the neck and the neck secured to shank 51 by a rivet 54 through sleeve 56 and shank stud 58. Opening 60 in cap 41 has a diameter less than the diameter of head 62 and is bevelled upwardly and outwardly to permit head 62 and neck 52 is pivot freely, in the manner indicated in FIG. 2.

FIG. 5 illustrates another embodiment of my invention in which a neck portion 63 of shank 64 is threaded into an axial bore 66 of the shank and locked therein by nut 68.

FIG. 6 shows pad 70 having a socket 72 formed therein and the tapered rim 74 of said socket swaged inwardly, as illustrated by the broken and solid lines, to form an annular shoulder 76 defining circular opening 78 of lesser diameter than the maximum diameter of annular shoulder 80 of bulbous head 82.

With reference now to FIG. 7, a further embodiment of my invention is shown in which neck portion 86 of shank 88 is press-fitted into axial bore 90 of the shank and locked therein by friction. Neck portion 86 can be knurled, as designated by numeral 92, to enhance the friction fit, or welded to shank 88.

The embodiments of FIGS. 4, 5 and 6 obviate the need for a split ring in combination with cap 41.

It will be noted that heads 30 and 82, shown most clearly in FIGS. 2 and 6, are flattened at their ends to define a space between the respective heads and socket walls to permit the accumulation of weld spatter and the like fragments of metal and slag.

The members 12,14, the shank 11 and shoe assembly 32 of the C-clamp of the invention are preferably all formed of steel and the ring 36, as previously indicated, is preferably formed of spring steel. The pad shoe can be formed of brass, aluminum or plastics to protect the surface of the work-piece and can be provided with a planar bearing surface, as illustrated, or a concave, convex, V-block or such desired configuration to accommodate various shapes of work-pieces.

While the foregoing description relates to the use of the connector of the invention in combination with a screw clamp, it will be understood that the said connector has utility with other types of hold-down clamps such as hydraulic-actuated or pneumatic-actuated piston-cylinder assemblies, jigs and fixtures, and other like securing devices wherein the connector detachably secures a pressure pad to an extensible and retractable piston rod or arm. The embodiments shown in FIGS. 2–7 therefore can form part of a piston rod or arm and the term "bolt shank" used in the specification and claims will be understood to include a piston rod or arm.

The present invention provides a number of important advantages. The clamp shoe can be readily removed from the clamp shank for replacement, maintenance or lubrication as necessary and the bearing pad substituted as desired for intended use. Notwithstanding facile removal, and the ability for increased pivotal movement about the shank axis, the clamp shoe assembly is substantially free of accidental detachment.

It will be understood of course that modifications can be made in the embodiment of the invention illustrated and described herein without departing from the scope and purview of the invention as defined by the appended claims.

What I claim as new and desire to protect by Letters Patent of the United States is:

1. A connector for securing a swivel pad to a bolt shank of a clamp comprising a first connecting element formed at one end of said bolt shank and a second connecting element detachably secured to said swivel pad, said first connecting element comprising a head formed at the end of the bolt shank of enlarged cross-sectional area relative to the adjacent portion of the bolt shank having a substantially spherical end surface and truncated adjacent the bolt shank to define a spherical segment having a radial thickness of about $\frac{1}{8}$ to $\frac{1}{2}$ of the radius of the head spherical end surface and an annular shoulder substantially perpendicular to the axis of the shank, the swivel pad having a socket formed in one side thereof for receiving said head, said socket having a radius substantially equal to the radius of the head spherical end surface, and said second connecting element comprising means detachably secured to said pad at the entrance to the socket to restrict the cross-sectional area of the entrance to the socket to prevent withdrawal of said head from said socket whereby said shoe assembly can freely pivot and swivel about the end of the shank.

2. A connector as claimed in claim 1 in which said substantially spherical end surface of the shank head is flattened to define a space between the clamp head and surface of the pad socket.

3. A connector as claimed in claim 1 in which the shank adjacent the head is of reduced cross-sectional area defining a neck.

4. A connector as claimed in claim 3 in which said second connecting element comprises a cap adapted to be secured to said pad, said cap having a central opening formed therein for receiving the neck portion of the shank, said central opening having a diameter less than the maximum diameter of the annular shoulder of the clamp head.

5. A connector as claimed in claim 4 in which said cap central opening is bevelled outwardly to enhance pivotal movement of the shoe about the shank end.

6. A connector as claimed in claim 4 in which said neck portion of the bolt shank is formed separately from and securable to the bolt shank.

7. A connector as claimed in claim 6 in which said neck portion of the bolt shank is securable to the bolt shank by screwing said neck portion of the shank into a threaded axial bore formed in the bolt shank.

8. A connector as claimed in claim 6 in which said neck portion is securable to the bolt shank by press fitting the said neck portion into an axial bore formed in the bolt shank.

9. A connector as claimed in claim 6 in which said neck portion of the bolt shank is securable to the bolt shank by forming a sleeve at the end of one of said neck portion or bolt shank and a mating stud at the other and securing said stud in said sleeve by detent means.

10. A connector as claimed in claim 4 in which said cap is secured to said pad by a threaded connection.

11. A connector for securing a swivel pad to a bolt shank of a clamp comprising a first connecting element formed at one end of said bolt shank; a shoe assembly having said pad for contacting a work-piece and having a second connecting element formed therein, said first connecting element comprising a head and said second connecting element forming a socket for receiving said head, said head being of enlarged cross-sectional area relative to the adjacent portion of the shank defining a neck and having a substantially spherical end surface truncated adjacent the shank neck to define an annular shoulder substantially perpendicular to the axis of the shank; said neck portion of the bolt shank being knurled and formed separately from and securable to the bolt shank by press fitting the said neck portion into an axial bore formed in the bolt shank; and the entrance of the socket being of lesser cross-sectional area than said head, whereby said shoe assembly can freely pivot and swivel about the end of the shank.

12. A connector for securing a swivel pad to a bolt shank of a clamp comprising a first connecting element formed at one end of said bolt shank and a second connecting element detachably secured to said swivel pad, said first connecting element comprising a head formed at the end of the bolt shank of enlarged cross-sectional area relative to the adjacent portion of the bolt shank having a substantially spherical end surface and truncated adjacent the bolt shank to define an annular shoulder substantially perpendicular to the axis of the shank, said bolt shank adjacent the head being of reduced cross-sectional area defining a neck, the swivel pad having a socket formed in one side thereof for receiving said head, said socket having a radius substantially equal to the radius of the head spherical end surface, and said second connecting element comprising means detachably secured to said pad to restrict the cross-sectional area of the entrance to the socket to prevent withdrawal of said head from said socket whereby said shoe assembly can freely pivot and swivel about the end of the shank, said means to prevent withdrawal of the head from the socket comprising a split ring having a central opening greater than the diameter of the shank neck and smaller than the maximum diameter of the head annular shoulder whereby said ring can be mounted over the shank head for loose seating on the shank neck, and a cap adapted to be secured to said swivel pad, said cap having a central opening with a diameter greater than the diameter of the shank head but less than the outside diameter of the said split ring.

13. A connector as claimed in claim 12 in which said cap is secured to said pad by a threaded connection.

14. A connector in combination with a screw clamp comprising: a rigid frame having a leg integral therewith, said leg having a fixed pad for contacting a workpiece; a second leg parallel to said first leg depending from the frame and having a threaded aperture; an externally threaded shank rotatably received in said aperture and having a first connecting element at one end; a swivel pad for contacting said work-piece and having a second connecting element at one end, said first connecting element comprising a head formed at the end of the bolt shank of enlarged cross-sectional area relative to the adjacent portion of the bolt shank having a substantially spherical end surface and truncated adjacent the bolt shank to define a spherical segment having a thickness of about $\frac{1}{8}$ to $\frac{1}{2}$ of the radius of the head spherical end surface and an annular shoulder substantially perpendicular to the axis of the shank, said adjacent portion of the bolt shank forming a neck separable from and securable to the bolt shank, the swivel pad having a socket formed in one side thereof for receiving said head, said socket having a radius and depth substantially equal to the radius of the head spherical end surface, and said second connecting element comprising a cap adapted to be secured to said pad, said cap having a central opening formed therein for receiving the neck portion of the shank, said central opening located at the entrance of the socket and having a diameter less than the maximum diameter of the annular shoulder of the clamp head whereby said shoe assembly can freely pivot and swivel about the end of the shank.

* * * * *